US006322878B1

(12) United States Patent
Voigt et al.

(10) Patent No.: US 6,322,878 B1
(45) Date of Patent: Nov. 27, 2001

(54) PARTICULATE MATERIAL FOR SURFACE COATING AN OBJECT AND OBJECTS WITH SURFACES TO BE COATED

(76) Inventors: Richard M. Voigt, 13720 W. Keefe Ave., Brookfield, WI (US) 53005; Lynn S. Voigt, 168 S. 61st St., Milwaukee, WI (US) 53214; Mark B. Gart, 420 Vista Grande, Newport Beach, CA (US) 92659

( * ) Notice: Subject to any disclaimer, the term of this patent is extended or adjusted under 35 U.S.C. 154(b) by 0 days.

(21) Appl. No.: 09/264,104

(22) Filed: Mar. 8, 1999

Related U.S. Application Data

(63) Continuation-in-part of application No. 08/922,649, filed on Sep. 3, 1997, now Pat. No. 5,879,742, which is a continuation of application No. 08/538,141, filed on Oct. 2, 1995, now abandoned.

(51) Int. Cl.[7] ........................................ B32B 5/16

(52) U.S. Cl. .......................... 428/206; 428/207; 428/328; 428/330; 428/331; 428/402

(58) Field of Search .................................... 428/206, 207, 428/328, 330, 331, 402

(56) References Cited

U.S. PATENT DOCUMENTS

| | | | | |
|---|---|---|---|---|
| Re. 30,568 | * | 12/1980 | Fitton | 106/306 |
| 3,798,016 | * | 3/1974 | Filton | 106/306 |
| 5,182,103 | * | 1/1993 | Nakane et al. | 424/78.03 |
| 5,879,742 | * | 3/1999 | Voigt et al. | 427/180 |

* cited by examiner

*Primary Examiner*—Hoa T. Le
(74) *Attorney, Agent, or Firm*—George W. Wasson

(57) ABSTRACT

Powdered materials that will float on a liquid bath for use in a process of transferring a decorative pattern of the powdered materials to the surface of an object moved into contact with the surface of the liquid bath. Objects that can be decorated by the process. A decorated object produced by the process. A kit for use in performing the process.

17 Claims, 2 Drawing Sheets

PARTICULATE MATERIAL FOR SURFACE COATING AN OBJECT AND OBJECTS WITH SURFACES TO BE COATED

This application is a CONTINUATION-IN-PART of application Ser. No. 08/922,649 filed Sep. 3, 1997, now U.S. Pat. No. 5,879,742 which was a CONTINUATION of application Ser. No. 08/538,141, filed Oct. 2, 1995, now abandoned.

This invention relates to an object with a decorative surface coating, powdered materials for producing the decorative coating, a kit for performing the method with the powdered materials for producing the decorated surface, and a method for coating the surface of the object with the decorative coating. More particularly, the invention relates to process using non-toxic materials for producing a decorative coating on a surface of an object.

BACKGROUND OF THE INVENTION

1. Field of the Invention

It is known to produce a decorative pattern on the surface of an object, such as a sheet of paper or the like, by floating one material on the surface of a liquid material and transferring the floated material to the object by contacting a surface of the object with the surface of the liquid material. Typical of the known processes is the floating of an oil based liquid on a water surface; the oil based liquid, being immiscible with the water surface, can stay in a pattern and be transferred in that pattern to an object brought into contact with the water surface. The reverse of that process is also known where water based materials are floated on an oil based surface. It is also known to produce patterns of different colors by using float materials that will not mix on the float surface and will then be transferable as separate colors in some pattern. Variations on these prior art methods are used in xerography and other duplicating processes.

A difficulty with the prior art methods for production methods and hobbycraft activities is the problem of treating spills of the liquid materials and the "clean up" after the coating processes have been completed. Water based materials can usually be passed to conventional drains but there is some difficulty in disposing of oil based materials and more difficulty is encountered in cleaning up spilled oil based materials. In the case of a child's hobbycraft, the use of oil based materials as the transfer material is likely to produce more clean up activity than the hobbycraft activity itself. A further difficulty with prior methods for hobbycraft activities is the mixing of complex formulas for liquid baths that sometimes require hours, and even days, of advanced preparations for the actual hobbycraft activity.

SUMMARY OF THE INVENTION

The present invention employs the process of transferring patterned designs to the surface of an object by using a colorant material that is immiscible with a liquid material and that is compatible with the surface of the object. The process employs finely divided powder materials that are of a size that the surface tension of the liquid material will float the powder on the liquid without wetting the finely divided powder material due to a surfactant contained in the powder while permitting the powder material to be transferred from the liquid to the surface of an object contacting the liquid. The process employs finely divided powder material potentially consisting of various similar chemical formulations and/or compounds or groups but consisting mostly of compounds consisting essentially of aluminum silicate, hydrous calcium magnesium silicate, aluminum sulfate iron free, aluminum chloride, calcium carbonate, hydrous aluminum silicate and n-octyl alcohol, and other similar materials. The invention herewith disclosed teaches the novel methods of fine powder chalk like materials floated on a liquid bath like water. The size of these chalk like powders is such that the surface tension of the liquid bath and/or the precise formulation chosen allows the chalk like powders to float on the surface of the liquid bath. The powdered material will float on the liquid while permitting the powder material to be transferred.

In one form of the process, the powdered material is floated on the surface of a liquid bath by being blown, shaken, dripped, scraped or by other means placed into contact with the liquid bath. The powdered material may be finely pulverized chalk materials of different particle sizes composed of different formulations and compounds but consisting essentially of chalk material with surfactants and anhydrous or hydrous compounds and floats on the surface of the liquid in a pattern of its application or can be moved on the surface to produce a random pattern. The object that is to be decorated with the powdered material then is placed into contact with the liquid surface and the powdered material is transferred to the surface of the object. The object may then be dried or treated in steps to set the pattern on the object. The advantage of the powdered material process hereafter described is that the liquid bath may be readily available tap water and the powdered material may consist essentially of finely pulverized chalk materials with a selected range of particle sizes and surface characteristics. The further advantage of the use of these materials is that the accidental spill of the liquid or the powder, or the contact of the liquid or the powder with a user does not create a clean-up problem as the materials can be easily removed from a spill or surface without much effort.

The process of the present invention and the objects produced by the process can be accomplished by creating a pattern on an object with a substance that will not accept the transfer material, or by pretreating the object with a substance that will be attractive to the transfer material so that the transfer may be made directly to the object without the use of a liquid bath.

The transfer material may be either a powdered material or an almost liquid suspension of particles in a carrier that will act as a liquid without wetting the particles while being suspended and bouyant on the liquid. This aforementioned transfer material being known to be capable of numerous formulations and compounds but consisting essentially of chalk powders containing several known mutually functioning properties such as surfactants, anhydrous or hydrous chalk powders in suspension within fluid without wetting, or without absorbing or without combining with other powders, depending on the formulation in use. The use of a chalk as the powdered material provides a nontoxic substance for use with simple tap water thus providing a user safe environment.

The objects of the present invention include the production of objects with decorative or informational patterns of a transferred material onto a surface of the object in a simple and safe process.

A further object of the present invention in accord with the preceding object is a process for transferring patterns of one material onto another material in a safe and nonhazardous manner.

Another object of the present invention is the use of a nontoxic material in a pattern transfer process that will permit the method to be used by people of all ages on a wide range of surfaces.

Further objects and features of the present invention will be readily apparent to those skilled in the art from the appended drawings and specification illustrating preferred embodiments wherein:

DETAILED DESCRIPTION OF THE DRAWINGS

Figure 1:
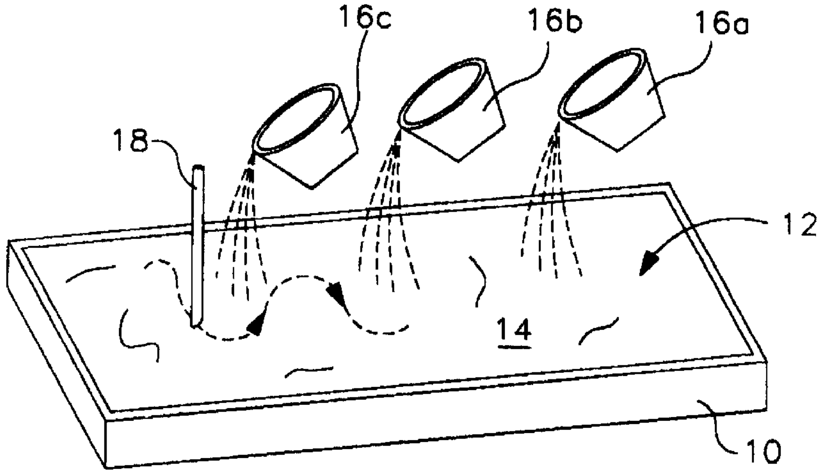
FIG. 1 is a perspective view illustrating the first step in a process of the present invention and illustrates elements of a kit used in performing the invention.
Figure 2:
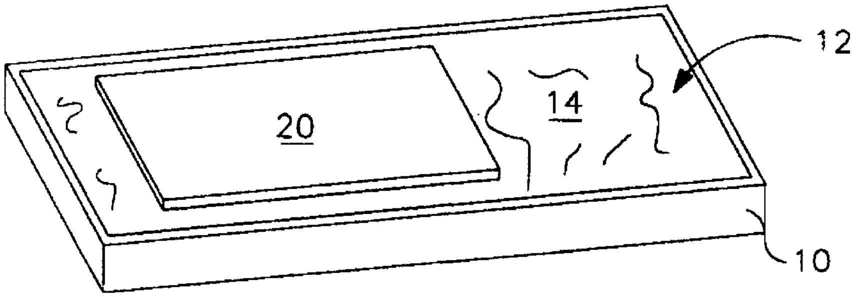
FIG. 2 is a view similar to FIG. 1 and illustrating a second step in a process of the present invention.
Figure 3:
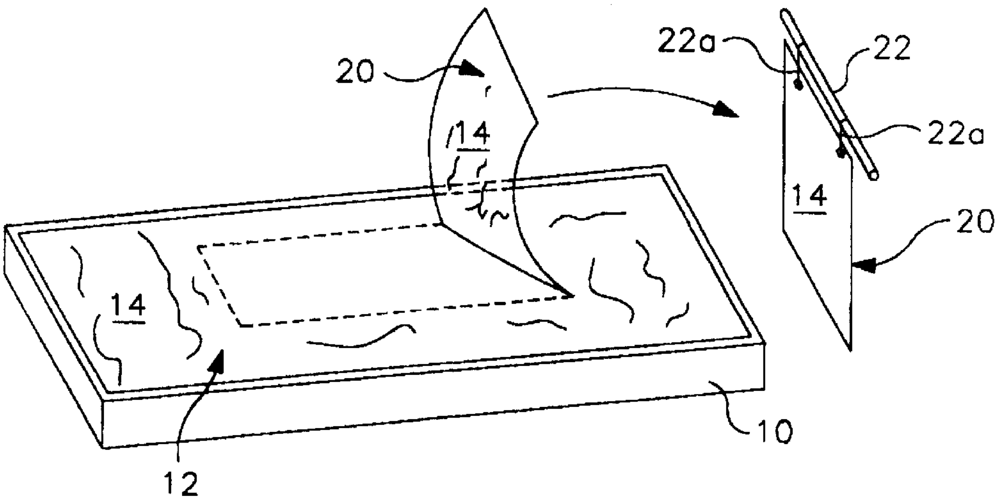
FIG. 3 is a view similar to FIGS. 1 and 2 and illustrating a third step in a process of the present invention.

One of the preferred embodiments of the present invention is illustrated in a three step process employing a kit as illustrated in FIGS. 1–3.In these FIGs a shallow flat container 10 is adapted to contain a liquid bath 12 in its interior. The surface of the liquid bath 12 is illustrated in FIG. 1 in a condition to receive a second material 14 that will float on the surface of the liquid bath. The source of the second material is illustrated in FIG. 1 as containers 16*a*, 16*b*, and 16*c* from which the second material 14 flows to contact and float on the surface of the liquid bath 12. It should be understood that the containers are shown as several containers to illustrate that separate colors or multiple forms of the second material 14 are contemplated in the process of the present invention. It should also be understood that the second material 14 is a material that is immiscible with the material composing the liquid bath 12. The transfer material being known to be capable of numerous formulations and compounds consisting essentially of chalk powders containing several known mutually functioning properties such as surfactants, anhydrous or hydrous chalk powders in suspension within fluid without wetting, or without absorbing or without combining with other powders, depending on the formulation in use. As further illustrated in FIG. 1, a rod or other object 18 may be used to stir or blend the second material 14 into a desired pattern on the surface of the liquid bath 12. Additional mixing methods and techniques will be described hereinafter.

FIG. 2 illustrates the container 10 with the liquid bath 12 and the second material 14 floating on its surface and adds an object 20 floating on or in contact with the surface of the bath 12. The object 20 is to be coated with some or all of the floating material 14 on one surface of the object 20 by capillary attraction between the surface of the object 20 and a portion of the liquid bath 12 including the floating material 14 on the surface of the bath.

FIG. 3 illustrates the removal of the object 20 from the surface of the liquid bath 12 and the transport of the object 20 to a place or position for drying, here shown as a rod 22 with hangers 22*a*.

Figure 4:
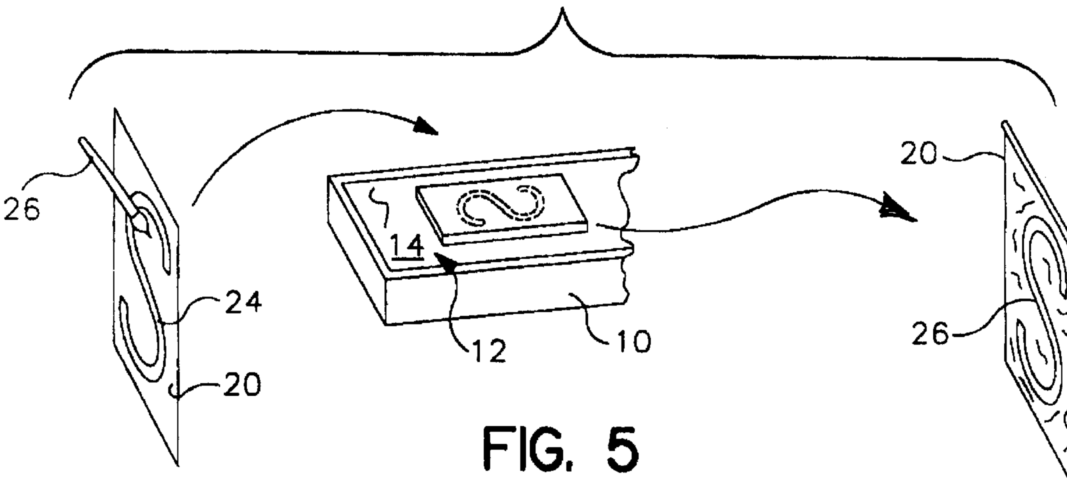
FIGS. 4, 5 and 6 are views similar to FIGS. 1–3 and illustrate alternative processes for performing the present invention.

FIG. 4 illustrates and alternative form of the process of the present invention. In this FIG the object 20 is initially coated with a pattern 24 (S shaped) with a brush 26 or the like for applying a material in the desired pattern before the object 20 is placed into the liquid bath 12 with the second material 14 floating on its surface. The applied material and the material of the object 20 can be selected from materials that will absorb the second material or that will reject the second material. Through selection of the applied material it is possible to transfer the second material 14 to the object 20 either on the whole object, except that portion coated with the applied material, or to transfer the second material 14 only to the portion of the object 20 where the applied material has been applied while leaving the rest of the surface of the object 20 uncoated.

Figure 5:
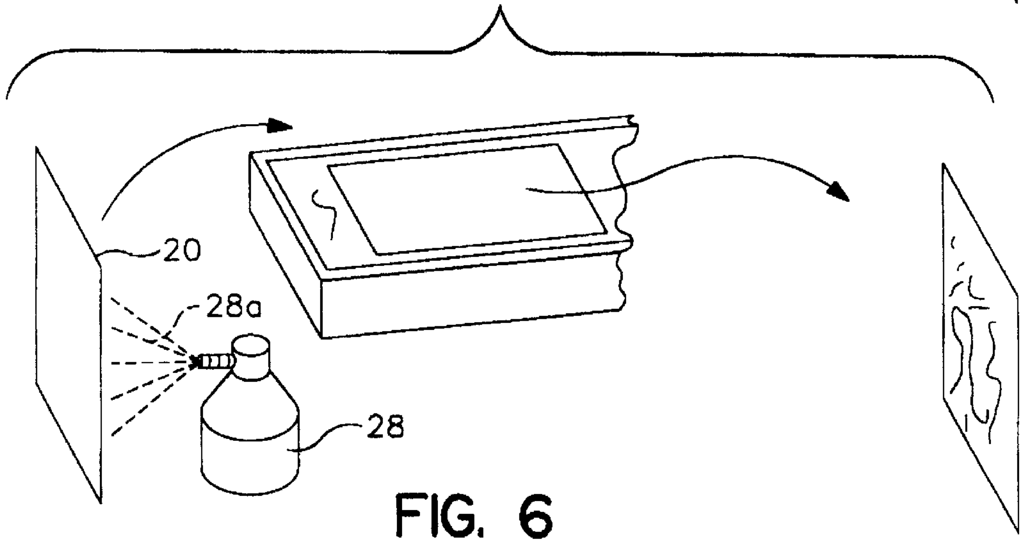

FIG. 5 illustrates another alternative form of the process of the present invention. In this FIG the object 20 is sprayed, dusted or coated with a material 28*a* from a source 28 before the object is placed in the liquid bath 12. The process here illustrated employs a coating on the object 20 that will pick up the second material 14 floating on the liquid bath 12. With the process here illustrated, the coating of an object 20 can be partial or entire depending upon the extend of coating with the material 28*a* and the pattern of that coating. The process may also use a material 28*a* that will reject the second material 14 where the material 28*a* has been applied.

Figure 6:
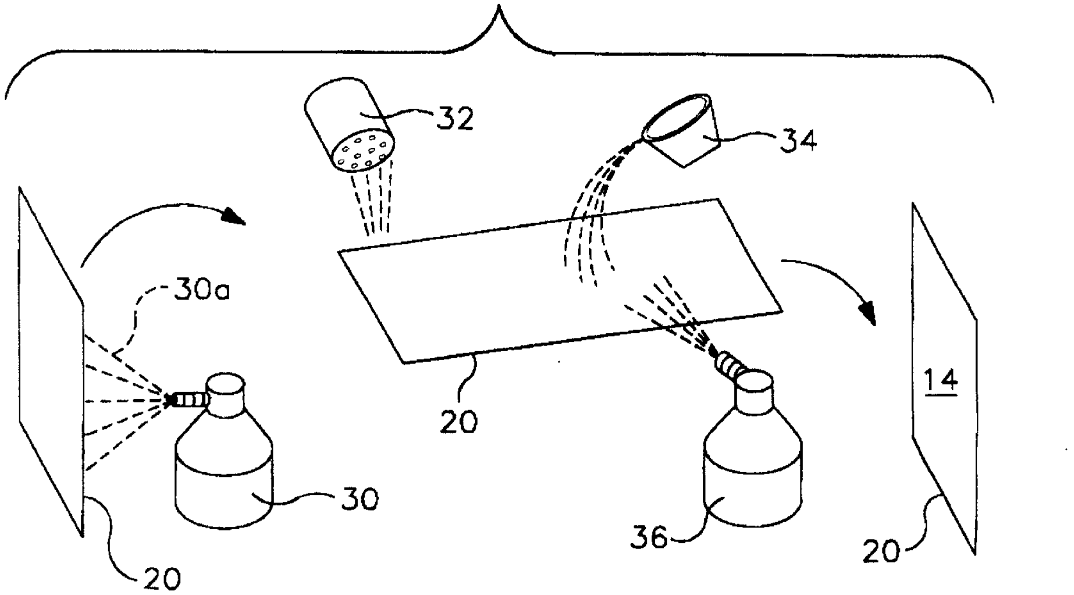

FIG. 6 illustrates a further modification of the process of the present invention which combines some of the features of the process illustrated in the preceding FIGs. In this illustration, the object is precoated with a material 30*a* from source 30 and then passed to an area where it may be dusted or coated with materials from sources such as a shaker 32,a container 34 or a liquid source 36 each of those sources containing the second material 14 in some transferable form. The object 20 then is coated with a patterned surface of the materials from the sources and then allowed to dry to its end form.

The present invention is effective as a safe and nontoxic process for producing decorated objects by the use of a finely divided particulate material in the form of a chalk to develop the second material that is floated on the liquid bath 12 or spayed on the object in other forms of the process. It has been discovered that certain forms of chalk can be divided to the desired particle size to then be floatable on a liquid surface or to them be transportable with a liquid vehicle. The particle size of the chalk, its weight as a particle and its surface tension is such that the chalk will float on a chemically inert material, such as common tap water, and will produce a floating pattern in desirable form. The chalk further can be in many different colors to produce color patterns in the floating materials and the different colored chalks will not join to blend the colors but will remain in swirling patterns of their own separate colors. The chalk material may be formulated in numerous different forms; however, the final formulation and/or compound will function as described herein. Preciseness of the chemicals and compound formulation are described as basic components such that the formulation and compounds do not limit the herein described invention, of transferring chalk powders, floated on a water type bath, onto a substrate, in a non-toxic, non-staining, easily performed process wherein these compounds consist essentially of the powders herein described. The chalk material may be a compound consisting essentially of aluminum silicate, hydrous calcium magnesium silicate, aluminum sulfate iron free, aluminum chloride, calcium carbonate, hydrous aluminum silicate and n-octyl alcohol, and other similar materials. The compound may be hydrous or anhydrous.

The liquid bath 12 placed in the container 10 can be any liquid that will be immiscible with the particles or liquids forming the second material 14. The preferred form of that liquid is standard tap water; that liquid being readily available in unlimited quantity. Liquids other than water are contemplated in this invention; the liquid must be capable of floating the second material 14 and be capable of being transferred to an object or capable of releasing the second material 14 to the object. Tap water is non-toxic making the bath of the present invention a non-toxic bath. In some cases, the present invention is best performed with warmed water at least to room temperature; warming the water to higher temperatures may assist in the transfer of the second material or in maintaining the second material on the surface of the liquid bath.

Because the liquid bath is tap water and because the floating particulate materials are non-toxic, immiscible with the liquid bath and, in most cases, non-mixing among themselves, the liquid bath may be reused or reclaimed for continued use. It may become necessary to remove particles from the surface of the bath by absorption, scraping or skimming to get a clean surface, but those steps are easily accomplished. It is possible to provide a lip on the container 10 to permit overflow of the surface of the liquid to carry excess particles out of the bath, or a squeegee like blade can be passed over the surface to carry the particles to a drain.

The second material 14 may be in the form of a fluid composed of particulate materials including added surfactants that flow as a liquid as well as the particles suspended in a liquid. The importance of the particle size is that it must be small enough to float on the surface of the liquid bath or be transportable with fluids into or onto the surface of the object to be decorated. It may also be desirable to add to the particles, or the liquid carrying the particles, a hydrous or anhydrous wetting agent or surface tension adjuster to aid in maintaining the liquid surface buoyancy or to facilitate the transfer of the powder to the surface to be decorated. The use of wetting agents and surface tension adjuster materials are known.

The second material 14 may be a mixture of different particle sizes or different forms of particles to produce variations in the pattern or texture of the transfer to the object being decorated. With different materials and sizes it may be possible to have a background of a first material with highlights of a second material dispersed throughout the transfer. The resultant decorated object could then have a background of one form and a texture of the second or third particles.

These different particles may be different colors but should be nonmixing among themselves so as to not change the total color of the floated materials; that is, the color particles should not mix to form a different color. The nonmixing characteristic can be accomplished by applying a coating to the particles. The particles can be swirled on the bath surface to produce interesting patterns.

The production of patterns of particulate materials on the surface of the liquid bath may be accomplished by stirring as shown in FIG. 1 or may be accomplished by using jets of air circulating above or below the liquid bath surface to agitate and stimulate the movement of second material particles 14 on the surface 12 of the bath. The same agitation can be accomplished by using an electrical voltage stimulation above or below the liquid bath 12 to move the second material particles 14. The development of patterns of particulate materials can also be accomplished by adding or subtracting liquid bath material from above or below the bath surface to agitate and stimulate the movement of the second material particles 14.

The pattern of the eventual decoration on an object 20 can be the transfer of the second material 14 from the liquid bath 12 or may be a selective transfer of some of the material 14 on the bath 12. As illustrated in FIG. 4, the object 20 is pretreated with a pattern by brushing the pattern 24 onto the object, the transfer of particulate material 14 can be either to the pattern of the pretreatment or can be to the remainder of the object and not to the pretreated portion. The difference in the transfer is the selection of the material for pretreating the object. If the pretreatment repels the particles, no particles are transferred to that portion; if the object itself will not accept the particles except in those portions that have been pretreated, the object will have only a pattern transferred. Variations on these pretreatment steps include using a sponge to prewet the object to inhibit or to encourage the pattern transfer, stencils attached to the object that may be removed later to produce an undecorated portion of the object, wax crayons, paint, waxed paper or the like to inhibit the transfer process. The second material 14 or the object may be pretreated with surfactants, wetting agents, hydrous and/or anhydrous materials.

The pattern of the transfer of the second material 14 to the object 20 can also be varied by the process of contacting the object with the surface of the bath 12. It is possible to float the object 20 on the surface 12 as shown in FIG. 1 and it is also possible to contact the object 20 and the surface 12 in a moving process wherein a first portion of the object 20 contacts the surface 12 and is moved on the surface followed by other portions of the object 20 moved to be placed in contact with the surface of the bath 12. Because the second material 14 is floating on the surface of the bath 12,the materials 14 will flow into those areas of the bath 12 that have had the transfer of materials 14 so as to provide a renewed supply of the second material 14 for transfer to the object 20. Because some of the bath material 12 transfers to the object with the materials 14,the surface bath material 12 flows into the transfer area carrying the renewed supply of the second material 14 to the transfer area.

The objects that can be decorated by the methods of the present invention include paper, cloth, porous wood products including composites, plastic compositions, artists modeling clay, high thread count fabrics regardless of the yarns (natural or synthetic) used in the fabric, recycled paper products, layered mat boards, and foam boards. The characteristic of the object material is that it must be able to absorb, or accept the liquid of the bath and the second material 14 or at least accept the second material 14 onto the surface of the object.

Setting and after treatment of the object 20 after the transfer process has been completed will be effective in preserving the transferred decoration on the object. The setting can be accomplished by heating the object both to dry the object and to set the transfer. Heating can be accomplished by conventional radiant or convection heat as well as by ultraviolet, infrared or molecular radiation. Chemical treatment with a spray or bath may also be used with the heat setting to further insure that the transferred decoration will not be abraded from the object or to prevent sun damage to the decoration. The precise formulation of the setting process will be slightly dependent on the precise formulation and compounds used in the powders and chalks described herein. Notwithstanding, the invention disclosed herein teaches numerous means to obtain the inventive end product of a substrate with the decorative transfer material consisting of the powders described.

Within this specification, the process of decorating the surface of an object has been described as having the transferred decoration drawn into the surface of the object by the wetting or absorption function; however, it should be understood that the powder colorants may be chosen such that their contact with the surface characteristics of the colorant may chemically bond to the surface of the object to further enhance the transfer of the decoration. This process may be particularly important in the use of acid type dyes for paper and cloth.

Further, the preferred listing of chemical composition of the colorant as a chalk is not intended to exclude other possible chemicals or compositions that will be effectively transferred to the surface of an object to accomplish the desired surface decoration. Some chalks have been tested in the process, but there are believed to be over 3000 types of dyes and colorants that may include powdered materials or materials with the desired surface tension that will permit that product to transfer into or onto the surface of an object to accomplish the desired surface decoration.

Samples of chalks were analyzed for size of particles. Particles were predominantly plates and needles. The sizes of the particles were:

| | Plate size range | Needle size range (in m) | |
|---|---|---|---|
| Sample | (in m) | length | width |
| 6 | 4–20 | 4–12 | 1–2 |
| 7 | 3–15 | 2–7 | |
| 8 | 3–20 | 4–7 | 1 (approx.) |
| 9 | 2–10 | 3–10 | 1 (approx.) |

Samples of chalks were analyzed for composition.

| COMPOSITION | | | |
|---|---|---|---|
| Sample | Major | Moderate | Minor |
| C-10 | S, Ca | O | Al, Si, Ti |
| C-11 | S, Ca | O | Si, C |
| C-12 | S, Ca | O | C, Ba |
| C-13 | S, Ca | O | Na, A, Si |

Two samples of chalk were analyzed by IR analysis for surfactant content. Both of the samples contained a fatty acid surfactant indicative of amide functionality. The samples showed surfactants that were similar but may be different homologues of the same generic class of surfactants.

From these analyses it is believed that the ability of the particulate material to float on the water bath is a combination of the particle size, the chemical composition and the added surfactant.

While the present invention has been described as a hobbycraft process, it should be understood that the process, the transfer material and the objects produced by the process may be performed in a production process with automated steps for producing repeated decorated objects. Further, the introduction of the second material whether powder or liquid form and the stirring of the bath can be done in a programmed manner to produce substantially duplicate patterns in the floated materials. The programming can be used to produce selectable color patterns or hues in the floated material for transfer to objects.

The kit including the bath container and at least one container of particulate material would also include instructions in written, audiotape, videotape or more than one of these forms that would instruct a user in the use of the kit and the performance of the method described herein.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:

1. A powdered material for use in a method of coating a surface a porous object with said powdered material from a surface of a liquid bath, said powdered material being floated on said surface of said liquid bath, said powdered material being a compound having components consisting essentially of aluminum silicate, hydrous calcium magnesium silicate aluminum sulfate iron free, aluminum chloride, calcium carbonate, hydrous aluminum silicate and n-octyl alcohol.

2. The powdered material of claim 1 wherein a component of said powdered.

3. The powdered material of claim 1 wherein a component of said powdered material is an hydrophobic material.

4. The powdered material of claim 1 wherein said powdered material is a chalk.

5. The powdered material of claim 1 wherein said powdered material is a clay.

6. The powdered material of claim 1 wherein said powdered material is treated with a material to increase its surface tension.

7. The powdered material of claim 1 wherein said powdered material is a nontoxic material.

8. The powdered material of claim 1 wherein said powdered material is a mixture of multicolored powder materials and different colored materials, said powder materials and said colored materials are coated to prevent mixing among themselves when floated on said surface of said liquid bath.

9. The powdered material of claim 1 wherein said powdered material is a premixed combination of powdered materials, surface conditioners for said liquid bath, and absorption enhancing materials for said porous object.

10. The powdered material of claim 1 wherein said powdered material consists essentially of particles having sizes in the range of about 1 to about 20$\mu$m.

11. The powdered material of claim 1 wherein said powdered material includes a surfactant in the compound of said powdered material.

12. The powdered material of claim 11 wherein said surfactant is immiscible with said liquid bath.

13. The powdered material of claim 12 wherein said surfactant is hydrophobic.

14. The powdered material of claim 1 wherein said powdered material is a chalk formed of particulate chalks having a surfactant coating that assists in making said powdered material hydrophobic.

15. The powdered material of claim 1 wherein said powdered material floats on said liquid bath and moves with portions of said liquid bath from said bath to an object to be coated with said powdered materials.

16. The powdered material of claim 1 wherein said powdered material includes component particles that remain separated from other component particles and float on said liquid bath as separated particles.

17. The powdered material of claim 1 with the addition of a surfactant material adapted to enhance said floating of said powdered material on said surface of said liquid bath and for coating said powdered material on said surface of said porous object.

* * * * *